United States Patent [19]
Alattar et al.

[11] Patent Number: 5,262,855
[45] Date of Patent: Nov. 16, 1993

[54] METHOD AND APPARATUS FOR ENCODING SELECTED IMAGES AT LOWER RESOLUTION

[75] Inventors: Adnan M. Alattar, Plainsboro, N.J.; Michael Keith, Holland, Pa.; Stuart J. Golin, East Windsor, N.J.

[73] Assignee: Intel Corporation, Santa Clara, Calif.

[21] Appl. No.: 856,515

[22] Filed: Mar. 25, 1992

[51] Int. Cl.$^5$ .............................................. H04N 7/12
[52] U.S. Cl. ...................................... 358/133; 358/56
[58] Field of Search ................. 358/133, 13, 135, 136, 358/262.1, 429, 182, 183; 382/56

[56] References Cited

U.S. PATENT DOCUMENTS

| | | | |
|---|---|---|---|
| 4,718,104 | 1/1988 | Anderson | 358/133 |
| 4,802,003 | 1/1989 | Takei et al. | 358/133 |
| 5,048,111 | 9/1991 | Jones et al. | 358/133 X |
| 5,150,209 | 9/1992 | Baker et al. | 358/133 |

*Primary Examiner*—Victor R. Kostak
*Attorney, Agent, or Firm*—Carl L. Silverman; William H. Murray; Daninel H. Golub

[57] ABSTRACT

A method and apparatus for encoding a sequence of digital motion video images at more than one resolution. In a first embodiment, it is determined whether an image selected from the sequence is part of either a dissolve, a fade, a fast motion region or a complex motion region. If the selected image is part of either a dissolve, a fade, a fast motion region or a complex motion region, then the selected image is encoded at a reduced resolution level. In a further embodiment, a selected image is provided for encoding. A determination is then made whether a parameter derived from an estimate of the available decoding time is above a predetermined threshold. If the parameter is above the predetermined threshold, then the selected image is encoded at a reduced resolution. In a still further embodiment, a selected image from a sub-sequence of images is provided for encoding. A determination is then made whether the quantization step size associated with the image is greater than a predetermined threshold. If the quantization step size is greater than the predetermined threshold, then the image is encoded at a reduced resolution. The image is partially encoded if it is within the first N minus one images provided from the sub-sequence, otherwise the image is fully encoded.

23 Claims, 6 Drawing Sheets

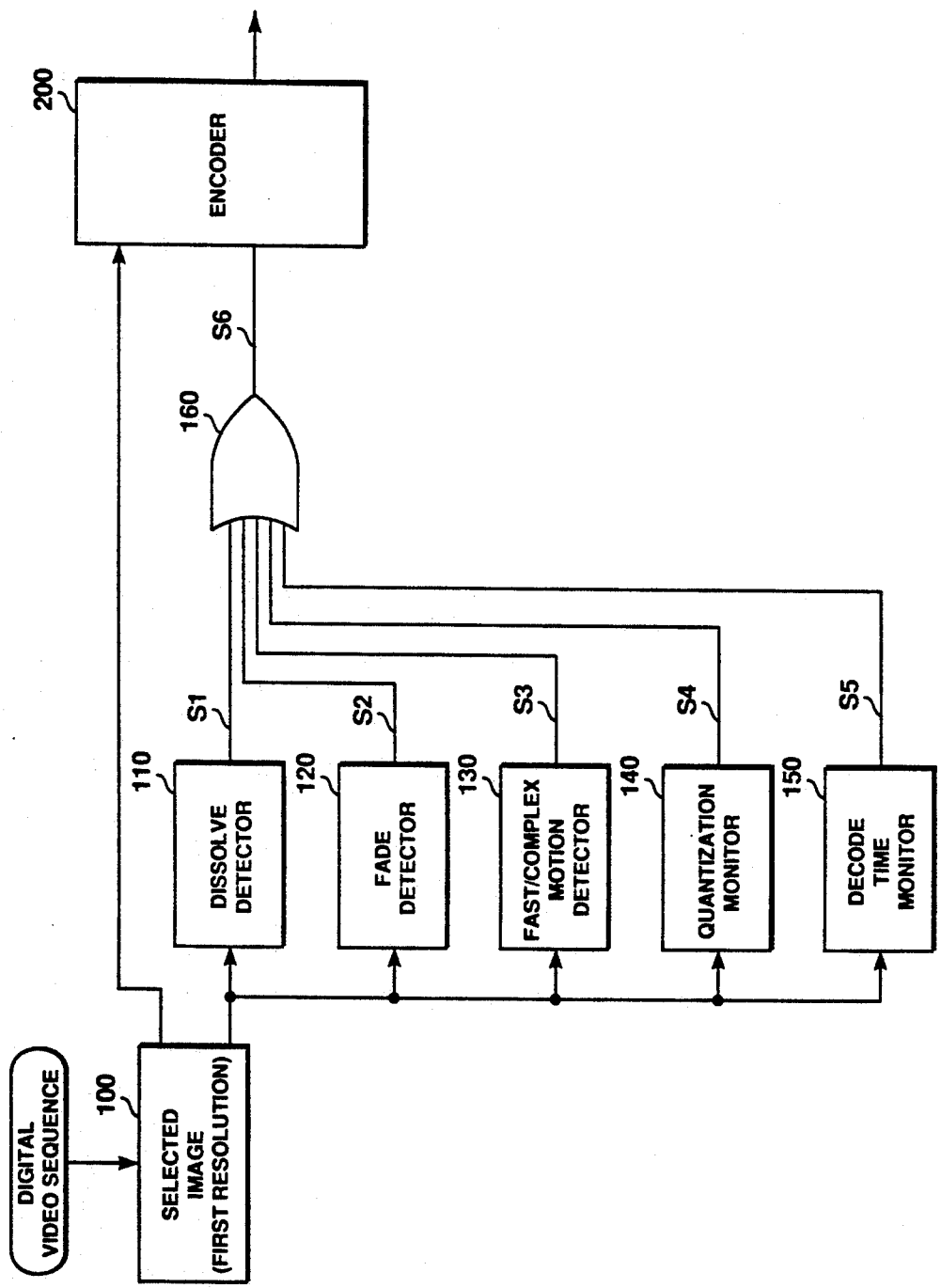

METHOD AND APPARATUS FOR ENCODING SELECTED IMAGES AT LOWER RESOLUTION

FIELD OF THE INVENTION

This invention relates to video signal processing generally and particularly to systems for providing a compressed digital video signal representative of a full color video signal.

BACKGROUND

When a typical motion compensation algorithm is used to compress video images found in dissolve regions, fade regions, fast motion regions or complex motion regions, a high entropy prediction error image is often produced. Encoding such an error image requires more bits than usual, which may not be affordable for all images in a region without increasing the average bit-rate. Furthermore, an image that is encoded with an insufficient number of bits may appear blocky or ugly when it is decoded. Similar problems in the appearance of a decoded image may occur whenever the quantization step size used to encode the image becomes too large.

During the decoding of compressed digital video image data, an image buffer is typically interposed between the decoder and the image display. Since the actual time necessary for decoding a particular image often varies within a sequence, the image buffer is needed to ensure that a constant supply of decoded images remain available for display. Despite the use of such an image buffer, it sometimes happens that the constant supply of images to the display is interrupted when a group of images requiring above-average decoding time are presented for decoding close in time.

It is therefore an object of the present invention to provide an improved method and apparatus for encoding images in dissolve regions, fade regions, fast motion regions or complex motion regions which reduces the number of bits needed to encode such images or improves image quality for a fixed number of bits.

It is a further object of the present invention to provide an improved method and apparatus for encoding images where the quantization step size being used becomes too large.

It is a still further object of the present invention to provide an improved method and apparatus for ensuring a constant supply of decoded images to an image display.

Further objects and advantages of the invention will become apparent from the description of the invention which follows.

SUMMARY OF THE INVENTION

A method and apparatus for encoding a sequence of digital motion video images at more than one resolution is disclosed. In a first embodiment, it is determined whether an image selected from the sequence is part of either a dissolve, a fade, a fast motion region or a complex motion region. If the selected image is part of either a dissolve, a fade, a fast motion region or a complex motion region, then the selected image is encoded at a reduced resolution level.

In a second embodiment, a selected image is provided for encoding. A determination is then made whether a parameter derived from an estimate of the available decoding time is above a predetermined threshold. If the parameter is above the predetermined threshold, then the selected image is encoded at a reduced resolution.

In a third embodiment, a selected image from a sub-sequence of images is provided for encoding. A determination is then made whether the quantization step size associated with the image is greater than a predetermined threshold. If the quantization step size is greater than the predetermined threshold, then the image is encoded at a reduced resolution. The image is partially encoded if it is within the first N minus one images provided from the sub-sequence, otherwise the image is fully encoded.

BRIEF DESCRIPTION OF THE FIGURES

FIG. 1 shows a flow diagram illustrating the operation of a preferred embodiment of the present invention.

FIG. 3 shows a flow diagram illustrating the operation of a decoder according to a preferred embodiment of the present invention.

DETAILED DESCRIPTION OF THE PREFERRED EMBODIMENT

Figure 1A:
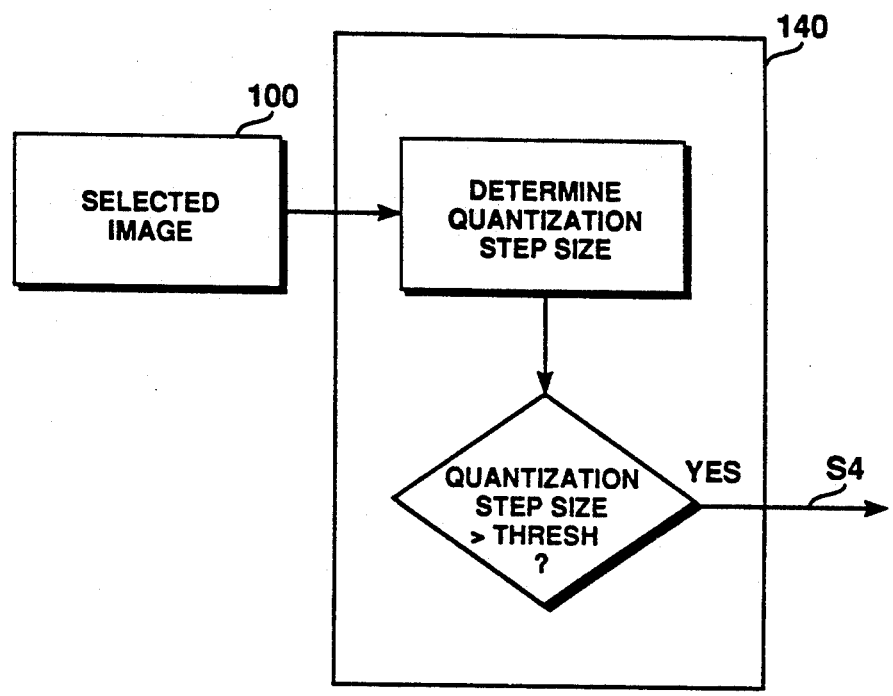
FIG. 1A is a flow diagram illustrating the operation of the Quantization Monitor shown in FIG. 1.

Referring now to FIG. 1, there is shown a flow diagram illustrating the operation of an encoder for encoding one or more images according to a preferred embodiment of the present invention. The present invention includes means 100 for providing a selected image from a sequence or sub-sequence of digital video images for encoding. The selected image is provided to means 110 for determining whether the selected image is part of a dissolve region, means 120 for determining whether the selected image is part of a fade region, means 130 for determining whether the selected image is part of a fast or complex motion region, means 140 for determining whether the quantization step size associated with encoding the selected image is greater than a predetermined threshold, and means 150 for determining whether an estimate of the available decoding time is above a predetermined threshold. Outputs signals S1, S2, S3, S4, S5 from means 110, 120, 130, 140, 150, respectively, are connected to or-gate 160. Output signal S6 for varying the resolution level used by encoding means 200 will go high if one or more of output signals S1, S2, S3, S4, S5 goes high. An encoder according to the present invention may be implemented using an Intel model 1860 parallel processor or a general purpose processor.

In the preferred embodiment of the present invention, means 110 for determining whether the selected image is part of a dissolve region is implemented by the dissolve detector described in co-pending U.S. patent application Ser. No. 836,992, filed Feb. 14, 1992, which is assigned to the assignee of the present application and the contents of which are incorporated herein by reference. More particularly, output signal S1 will go high when a dissolve region is detected to be present as described in the '992 application. In an alternate embodiment of the present invention, means 110 could be implemented by a preview technician visually monitoring a sequence or sub-sequence being encoded. In this embodiment, the technician would manually set S1 high when a dissolve region was observed to be present.

In the preferred embodiment, means 120 for determining whether the selected image is part of a fade region is implemented by the fade detector described in co-pending U.S. patent application Ser. No. 836,108, filed Feb. 14, 1992, which is assigned to the assignee of the present application and the contents of which are incorporated herein by reference. More particularly, output signal S2 will go high when a fade is detected to be present as described in the '108 application. In an alternate embodiment of the present invention, means 120 could be implemented by a preview technician visually monitoring a sequence or sub-sequence being encoded. In this embodiment, the technician would manually set S2 high when a fade was determined to be present.

In the preferred embodiment, means 130 for determining whether the selected image is part of a fast or complex motion region is implemented by a preview technician visually monitoring a sequence or sub-sequence being encoded. The technician manually sets S3 high when fast or complex motion is determined to be present. Means 130 could alternatively be implemented by use of a computer to analyze the individual images being encoded. For example, in order to detect a fast motion region, the average magnitude of displacement vectors may be calculated and monitored. A fast motion region would then be determined to be present when the average magnitude of the displacement vectors exceeded a predetermined threshold. A suitable value for this predetermined threshold is four pixels. In order to detect a complex motion region, the number of blocks whose displacements vary significantly from at least one nearest neighbor block may be calculated and monitored. A complex motion region would then be determined to be present when the number of such blocks exceeds a predetermined percentage. A suitable value for this predetermined percentage would be fifty percent or more blocks. In this embodiment, a block may be determined to have a displacement which varies significantly from one of its nearest neighbors if the subject displacement vectors vary by one or more pixels. An alternate method for both fast and complex motion is based on the residual errors of motion compensation prediction. Thus, for example, when the mean square error exceeds a predetermined threshold, S3 will be set high.

As shown in FIG. 1A, means 140 operates by comparing the quantization step size associated with encoding the selected image to a predetermined threshold. If the quantization step size exceeds the predetermined threshold, then means 140 sets output signal S4 high. In encoding images which are 256H×240V pixels at an average bit rate of 4500 bits per frame, a suitable value for the predetermined threshold is 30.

Means 150 operates by estimating the decoding time which will be available for decoding when the selected image is later processed by a decoder. In a preferred embodiment, an estimate of the available decoding time D is made during the encoding stage. Based on D, a feedback parameter C is calculated and used to control the decode time. Initially, C is one. When C gets large, the encoder takes steps to speed up decoding by not encoding things that are expensive to decode. Such steps will generally degrade image quality. When this degradation exceeds that caused by reducing the resolution, it is advantageous to reduce resolution. Reducing the resolution, as described herein, can greatly speed up decoding by reducing the number of pixels to decode.

The calculation of C is a 2-step process. In the first step, C[n], the value of C used during the compression of the nth image, is calculated according to equation (1) below:

$$C[n+1] = C[n](1 + k(<t> - T))  \qquad (1)$$

where t is the edt (estimated decode time) of the nth image, $<t>$ is t averaged over recent images, T is the target decode time, and k is an arbitrary constant. The value of t is determined during encoding by modelling or measuring the time which will be needed to decode the nth image. In the preferred embodiment, the decode time estimate is determined from a model. In an alternate embodiment, the decode time estimate may be determined during encoding by directing encoded images into a decoder and monitoring the time it takes to decode each image. The target decode time T corresponds to the fraction of the decoder available for actual decoding operations (as opposed to, for example, copying/scaling operations).

In the second step, a quantity D, which is initialized to 0, and updated after each frame, is calculated according to equation (2) below:

$$D[n+1] = D[n] + t - T \qquad (2)$$

D represents an estimate of how far behind the decoder is lagging behind. D is set to zero if it is less than zero. C' is then calculated according to equation (3) below:

$$C' = C*f[D] \qquad (3)$$

where C is as calculated in step 1, and C' is the final value of C. The function f is near unity for most values of D, but becomes large when D approaches CapacityT. The latter is a measure of the size of the output buffer. The function f is chosen so that C' is approximately equal to C when D is small, but C' increases rapidly as D approaches CapacityT. In the preferred embodiment, the parameter C is compared with a predetermined threshold. When C exceeds the threshold a determination is made to reduce resolution. In an alternate embodiment, the parameter D may be compared with a predetermined threshold. In that embodiment, a determination will be made to reduce resolution when D exceeds the predetermined threshold. In a still further alternate embodiment, a determination will be made to reduce resolution when $<t>$ exceeds a predetermined threshold.

Figure 2:
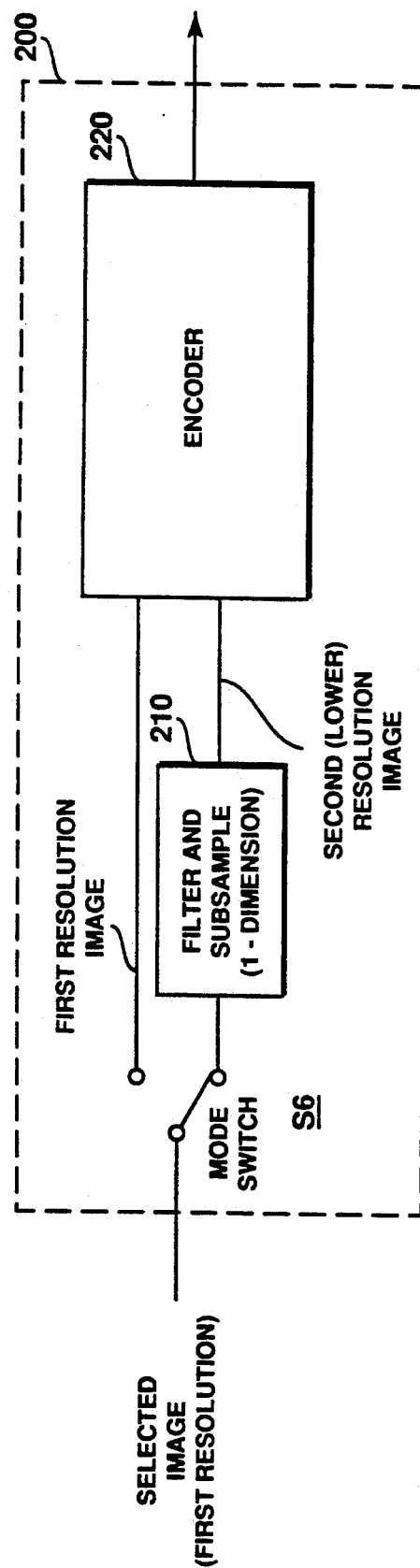
FIG. 2 shows a flow diagram illustrating the operation of an encoder according to a preferred embodiment of the present invention.
Figure 2A:
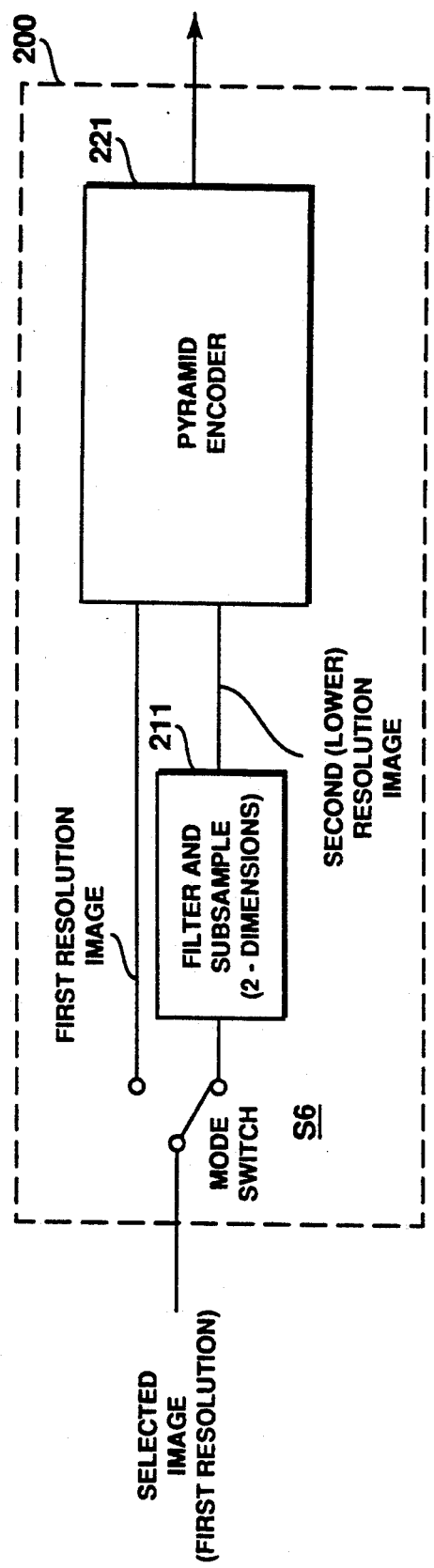
FIG. 2A shows a flow diagram illustrating the operation of an encoder according to a further preferred embodiment of the present invention.

Referring now to FIG. 2, there is shown a flow diagram illustrating the operation of encoding means 200 according to a preferred embodiment of the present invention. Encoding means 200 includes means 210 for filtering and subsampling a selected image, and means 220 for encoding an image. Output signal S6 operates to switch encoding means 200 between two different resolution encoding modes. More particularly, when output signal S6 is low, the selected image is encoded by encoding means 220 at a first level of resolution; when output signal S6 is high, the selected image is encoded by encoding means 220 at a second level of resolution. In the second resolution encoding mode, mode switch S6 directs the selected image to means 210 where the selected image is filtered in at least one dimension and subsampled to form an image at the second resolution level. The lower resolution image is then encoded by means 220. In the preferred embodiment, means 210 employs a (1, 2, 1) filter and the filtered image is subsampled to form a 256H×120V image. Other more specialized filters may also be employed and the subsampling rate may be varied. In an alternate preferred embodiment shown in FIG. 2A, the selected image may be filtered and subsampled in two dimensions by means 211.

Figure 2B:
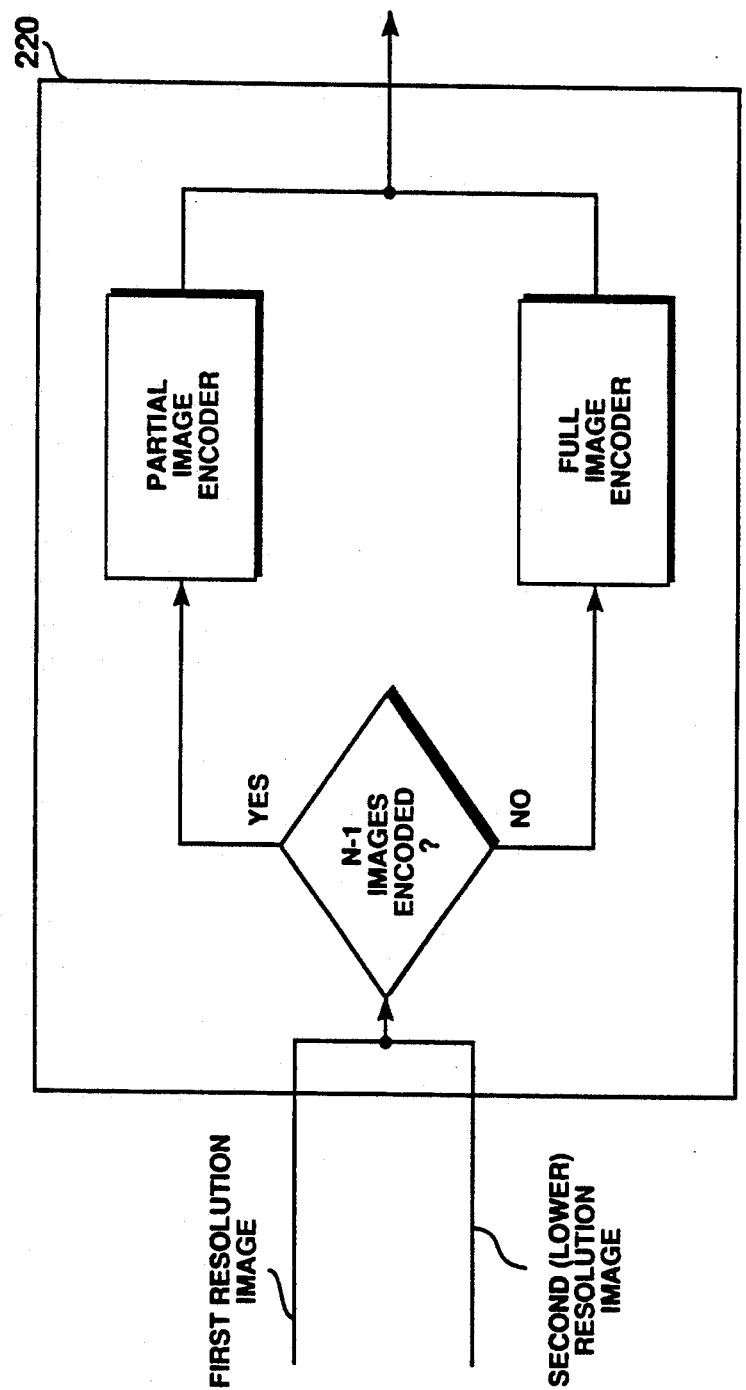
FIG. 2B shows a flow diagram illustrating a partial image encoder according to a further preferred embodiment of the present invention.

In the preferred embodiment, encoding means 220 is implemented by the encoder described in co-pending U.S. Pat. application Ser. No. 704,945, filed May 23, 1991, which is assigned to the assignee of the present application and the contents of which are incorporated herein by reference. As shown in FIG. 2B, means 220 operates by fully encoding every Nth image in a sequence and partially encoding images between every Nth image, where N is an integer which is greater than or equal to two. Each group of N images in the sequence is defined for purposes of this invention as a sub-sequence of images. The length of each sub-sequence may vary within a given sequence. Alternatively, encoding means 220 may encode a subsampled image provided by means 210 as a still image using pyramidal encoding or through other known encoding techniques.

Figure 2C:
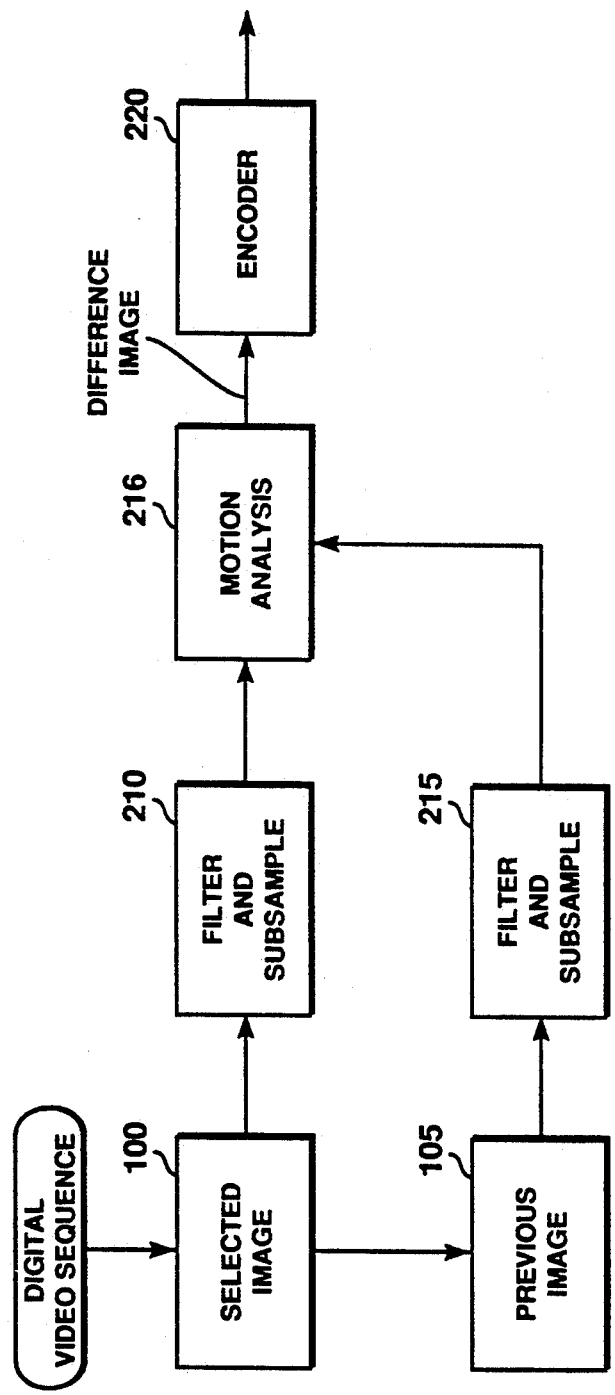
FIG. 2C shows a flow diagram illustrating the operation of an encoder according to the present invention for encoding difference images generated by motion analysis.

In a further alternative embodiment of the present invention shown in FIG. 2C a previous image 105 (encoded prior to the selected image) and means 215 for filtering and subsampling a previous image are further provided. According to this embodiment, when signal S6 is high, the selected image 100 and a previous image are both filtered in at least one dimension and subsampled down to a second level of resolution. Means 210 is provided for filtering and subsampling the selected image 100. A difference image at the second level of resolution is then formed by comparing the subsampled selected image to the subsampled previous image. The difference image formed is preferably an error image determined through motion compensation analysis by means 216. The difference image is then directed to encoding means 220 for encoding.

Referring now to FIG. 3, there is shown a flow diagram illustrating the operation of an decoder according to a preferred embodiment of the present invention. The decoder includes means 300 for decoding an encoded image and means 310 for expanding the resolution level of a decoded image. Means 300 for decoding is implemented by the decoder described in co-pending U.S. Pat. application Ser. No. 704,945, filed May 23, 1991. If the image decoded by means 300 was encoded at the first level of resolution, then the decoded image is sent from means 300 to an image display buffer. If the image decoded by means 300 was encoded at the second level of resolution, a mode switch directs the decoded image to means 310 which uses interpolation to expand the decoded image up to the first resolution level. Although in the preferred embodiment linear interpolation is used to expand the decoded image, other interpolators including non-linear interpolators may also be employed.

In an alternative embodiment of decoding means 300 (not shown), a previous image and means for filtering and subsampling the previous image are further provided. The previous image may be a reconstructed previous image. In this embodiment, when the mode switch of FIG. 3 is set to direct the decoded image to means 310, a previous image is filtered and subsampled down to the second level or resolution. An encoded difference image received by means 300 is then decoded and a difference image at the second resolution level is formed. A decoded image for display is then formed by comparing the subsampled previous image and the decoded difference image. The decoded image is then directed to means 310 for expansion up to the first level of resolution.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for encoding a sequence of one or more digital motion video images comprising the steps of:
    (a) providing an image from said sequence for encoding;
    (b) determining whether said image is part of a dissolve region; and
    (c) if it is determined that said image is not part of a dissolve region then
        encoding said image at a first level of resolution
    otherwise
        encoding said image at a second level of resolution, said second level of resolution being lower than said first level of resolution.

2. A method for encoding a sequence of one or more digital motion video images comprising the steps of:
    (a) providing an image from said sequence for encoding;
    (b) determining whether said image is part of a fade region; and
    (c) if it is determined that said image is not part of a fade region then
        encoding said image at a first level of resolution
    otherwise
        encoding said image at a second level of resolution, said second level of resolution being lower than said first level of resolution.

3. A method for encoding a sequence of one or more digital motion video images comprising the steps of:
    (a) providing an image from said sequence for encoding;
    (b) determining whether said image is part of a fast motion region; and
    (c) if it is determined that said image is not part of a fast motion region then
        encoding said image at a first level of resolution
    otherwise
        encoding said image at a second level of resolution, said second level of resolution being lower than said first level of resolution.

4. A method for encoding a sequence of one or more digital motion video images comprising the steps of:
    (a) providing an image from said sequence for encoding;
    (b) determining whether said image is part of a complex motion region; and (c) if it is determined that said image is not part of a complex motion region then
encoding said image at a first level of resolution
otherwise
encoding said image at a second level of resolution, said second level of resolution being lower than said first level of resolution.

5. A method for encoding a sequence of one or more digital motion video images comprising the steps of:
(a) providing an image at a first level of resolution for encoding;
(b) determining whether a parameter derived from an estimate of the available decoding time is above a predetermined threshold; and
(c) if it is determined that said parameter is above said predetermined threshold then
encoding said image at said first level of resolution
otherwise
forming a lower resolution image at a second level of resolution, and encoding only said lower resolution image, said second level of resolution being lower than said first level of resolution.

6. A method for encoding a sub-sequence of N digital motion video images, wherein N is greater than or equal to two, comprising the steps of:
(a) providing an image from said sub-sequence for encoding;
(b) determining whether the quantization step size associated with said image is greater than a predetermined threshold;
(c) if it is determined that said quantization step size is not greater than said predetermined threshold then
encoding said image at a first level of resolution
otherwise
encoding said image at a second level of resolution, said second level of resolution being lower than said first level of resolution,
wherein said image is partially encoded if it is within the first N minus one images provided from said sub-sequence, otherwise said image is fully encoded; and
(d) repeating steps (a)-(c) for the remaining images in said sub-sequence.

7. The method of claim 1, 2, 3, 4, 5 or 6, wherein said step of encoding said image at said second level of resolution comprises the steps of:
i. filtering said image in at least one dimension;
ii. subsampling said image in at least one dimension; and
iii. encoding said subsampled image.

8. The method of claim 7, wherein said image is filtered and subsampled in two dimensions.

9. The method of claim 7, wherein said subsampled image is encoded using pyramidal encoding.

10. The method of claim 7, wherein said subsampled image is encoded as a still image.

11. The method of claim 1, 2, 3, 4, 5 or 6, wherein said step of encoding said image at said second level of resolution comprises the steps of:
i. filtering said image in at least one dimension;
ii. subsampling said image in at least one dimension;
iii. providing a previous image from said sequence;
iv. subsampling said previous image; and
v. encoding a difference image derived from said subsampled image and said subsampled previous image.

12. The method of claim 11, wherein step (iii) further comprises the step of filtering said previous image in at least one dimension.

13. The method of claim 11, wherein said difference image in step (v) is determined using motion compensation.

14. An apparatus for encoding a sequence of one or more digital motion video images comprising:
(a) means for providing an image from said sequence for encoding;
(b) means for determining whether said image is part of a dissolve region;
(c) means for encoding said image at a first level of resolution if it is determined by said determining means that said image is not part of a dissolve region; and
(d) means for encoding said image at a second level of resolution if it is determined by said determining means that said image is part of a dissolve region;
wherein said second level of resolution is lower than said first level of resolution.

15. An apparatus for encoding a sequence of one or more digital motion video images comprising:
(a) means for providing an image from said sequence for encoding;
(b) means for determining whether said image is part of a fade region;
(c) means for encoding said image at a first level of resolution if it is determined by said determining means that said image is not part of a fade region; and
(d) means for encoding said image at a second level of resolution if it is determined by said determining means that said image is part of a fade region;
wherein said second level of resolution is lower than said first level of resolution.

16. An apparatus for encoding a sequence of one or more digital motion video images comprising:
(a) means for providing an image from said sequence for encoding;
(b) means for determining whether said image is part of a fast motion region;
(c) means for encoding said image at a first level of resolution if it is determined by said determining means that said image is not part of a fast motion region; and
(d) means for encoding said image at a second level of resolution if it is determined by said determining means that said image is part of a fast motion region;
wherein said second level of resolution is lower than said first level of resolution.

17. An apparatus for encoding a sequence of one or more digital motion video images comprising:
(a) means for providing an image from said sequence for encoding;
(b) means for determining whether said image is part of a complex region;
(c) means for encoding said image at a first level of resolution if it is determined by said determining means that said image is not part of a complex motion region; and
(d) means for encoding said image at a second level of resolution if it is determined by said determining means that said image is part of a complex motion region;
wherein said second level of resolution is lower than said first level of resolution.

18. An apparatus for encoding a sequence of one or more digital motion video images comprising:
  (a) means for providing an image at a first level of resolution for encoding;
  (b) means for determining whether a parameter derived from an estimate of the available decoding time is above a predetermined threshold;
  (c) means for encoding said image at said first level of resolution if it is determined by said determining means that said parameter is above said predetermined threshold;
  (d) means for forming a lower resolution image at a second level of resolution if it is determined by said determining means that said parameter is not above said predetermined threshold;
  (e) means for encoding only said lower resolution image if it is determined by said determining means that said parameter is not above said predetermined threshold;
  wherein said second level of resolution is lower than said first level of resolution.

19. An apparatus for encoding a sub-sequence of N digital motion video images, wherein N is greater than or equal to two, comprising:
  (a) means for providing an image from said sub-sequence for encoding;
  (b) means for determining whether the quantization step size associated with said image is greater than a predetermined threshold;
  (c) means for encoding said image at a first level of resolution if it is determined by said determining means that said quantization step size is not greater than said predetermined threshold;
  (d) means for encoding said image at a second level of resolution if it is determined by said determining means that said quantization step size is greater than said predetermined threshold;
  wherein said second level of resolution is lower than said first level of resolution, and said means for encoding at a first level of resolution and said means for encoding at a second level of resolution fully encode said image if said image is the Nth image provided from said sub-sequence, otherwise said means for encoding at a first level of resolution and said means for encoding at a second level of resolution partially encode said image.

20. The apparatus of claim 14, 15, 16, 17, 18 or 19, wherein said means for encoding said image at a second level of resolution comprises:
  i. means for filtering said image in at least one dimension;
  ii. means for subsampling said image in at least one dimension; and
  iii. means for encoding said subsampled image.

21. The apparatus of claim 20, wherein said means for filtering is provided with means for filtering and subsampling said image in two dimensions.

22. The apparatus of claim 14, 15, 16, 17, 18 or 19, wherein said means for encoding said image at a second level of resolution comprises:
  i. means for filtering said image in at least one dimension;
  ii. means for subsampling said image in at least one dimension;
  iii. means for providing a previous image from said sequence;
  iv. means for subsampling said previous image; and
  v. means for encoding a difference image derived from said subsampled image and said subsampled previous image.

23. The method of claim 22, wherein said difference image is determined using motion compensation.

* * * * *